United States Patent
Lucas et al.

(10) Patent No.: US 8,483,906 B2
(45) Date of Patent: Jul. 9, 2013

(54) DRIVER ASSISTANCE SYSTEM HAVING A PLURALITY OF ASSISTANCE FUNCTIONS

(75) Inventors: Bernhard Lucas, Besigheim (DE); Ulf Wilhelm, Rutesheim (DE); Martin Randler, Immenstaad (DE)

(73) Assignee: Robert Bosch GmbH, Stuttgart (DE)

( * ) Notice: Subject to any disclaimer, the term of this patent is extended or adjusted under 35 U.S.C. 154(b) by 887 days.

(21) Appl. No.: 11/883,969

(22) PCT Filed: Feb. 15, 2006

(86) PCT No.: PCT/EP2006/050947
§ 371 (c)(1), (2), (4) Date: Apr. 3, 2008

(87) PCT Pub. No.: WO2006/092361
PCT Pub. Date: Sep. 8, 2006

(65) Prior Publication Data
US 2008/0188996 A1    Aug. 7, 2008

(30) Foreign Application Priority Data
Mar. 1, 2005   (DE) .................. 10 2005 009 146

(51) Int. Cl.
G06F 7/00 (2006.01)
G06F 19/00 (2006.01)

(52) U.S. Cl.
USPC ............ 701/36; 701/45; 701/34.4; 340/438; 340/439; 180/410; 180/421

(58) Field of Classification Search
USPC ............... 701/29.1, 30, 32.3, 34.1, 34.4, 36, 701/45; 340/438, 439; 180/421, 410
See application file for complete search history.

(56) References Cited

U.S. PATENT DOCUMENTS

| | | | |
|---|---|---|---|
| 6,484,080 B2* | 11/2002 | Breed | 701/36 |
| 7,069,130 B2* | 6/2006 | Yopp | 701/45 |
| 2003/0065432 A1* | 4/2003 | Shuman et al. | 701/48 |
| 2003/0072305 A1* | 4/2003 | Odenwalder et al. | 370/389 |

FOREIGN PATENT DOCUMENTS

| | | | |
|---|---|---|---|
| GB | 2 394 076 | | 4/2004 |
| GB | 2394076 A | * | 4/2004 |
| WO | WO 02/084329 | | 10/2002 |
| WO | WO 2004/045898 | | 6/2004 |

OTHER PUBLICATIONS

Jordan R. et al; Safety Application Specific Requirements on The Data Processing of Environmental Sensors; Intelligent Vehicles Symposium, 2004 IEEE Parma, Italy Jun. 14-17, 2004; pp. 907-912.

* cited by examiner

*Primary Examiner* — Thomas Tarcza
*Assistant Examiner* — Adam Tissot
(74) *Attorney, Agent, or Firm* — Kenyon & Kenyon LLP

(57) ABSTRACT

A driver assistance system for motor vehicles has a sensor device for measuring data about the environment of the vehicle, at least two assistance functions, and a data processing device, which analyzes the measured data and generates at least one specific environmental hypothesis for each assistance function, which provides output data in a form prepared for the corresponding assistance function, at least one environmental hypothesis which has a structure divided into a plurality of partial hypotheses being predefined in the data processing device, and the partial hypotheses having such a logical relationship with one another that output data of one partial hypothesis flow into the generation of the other partial hypothesis, and at least two assistance functions directly or indirectly use a shared partial hypothesis.

18 Claims, 2 Drawing Sheets

*Fig.1* *Fig.2*
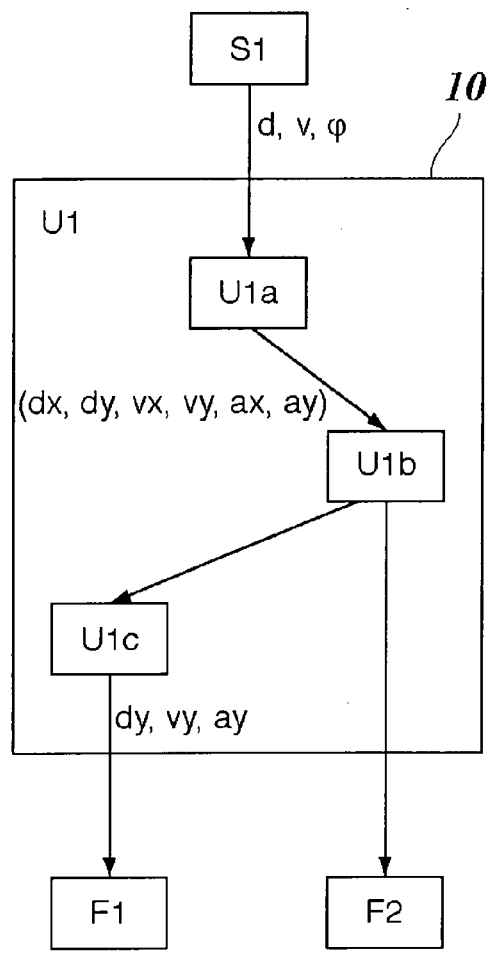
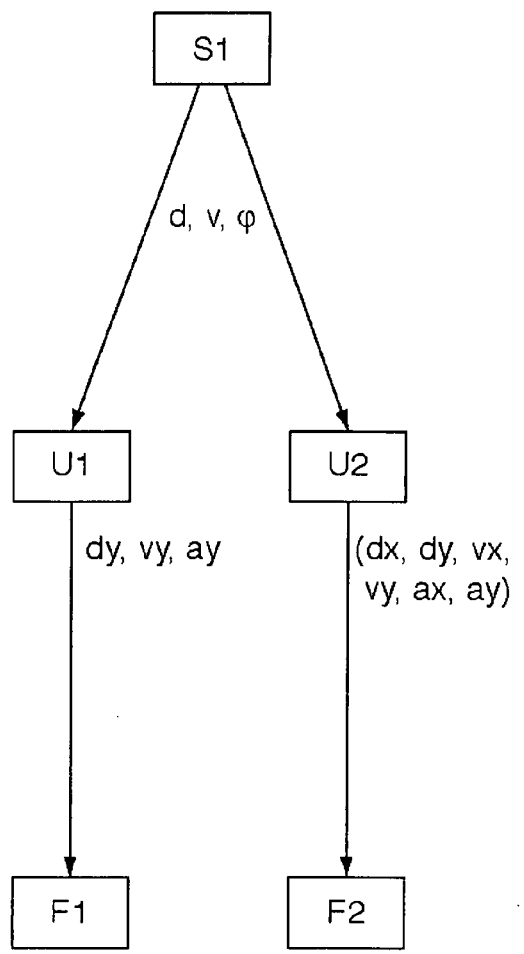
*Fig. 3*
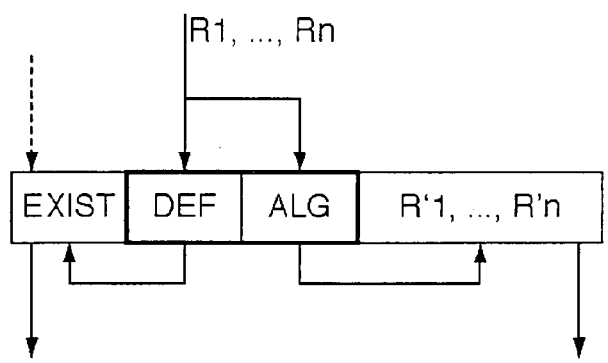

DRIVER ASSISTANCE SYSTEM HAVING A PLURALITY OF ASSISTANCE FUNCTIONS

FIELD OF THE INVENTION

The present invention relates to a driver assistance system for motor vehicles, having a sensor device for measuring data about the environment of the vehicle, at least two assistance functions, which are dependent on the measured data, and a data processing device which analyzes the measured data and generates at least one specific environmental hypothesis for each assistance function, which provides output data in a form prepared for the relevant assistance function.

BACKGROUND INFORMATION

A driver assistance system is understood as a device in a motor vehicle which supports the driver in driving the vehicle. One example of such a driver assistance system is, for example, an adaptive cruise control system (ACC system). This system makes it possible to find the position of vehicles traveling ahead with the aid of a sensor, typically with the aid of a radar sensor, and to regulate the speed of the host vehicle as a function of the measured distance to the vehicle traveling ahead in such a way that the vehicle traveling ahead, hereinafter referred to as "vehicle ahead," is followed at a reasonable safety distance.

Driver assistance systems are also understood as safety systems that warn the driver of danger and/or automatically intervene in the driving of the vehicle to avert the danger if possible or to limit the damage or activate passive safety systems such as airbags, seat belt tensioners and the like to mitigate the consequences of an accident. Systems of this type are known, for example, as pre-crash systems or PSS systems (predictive safety systems).

In general, a driver assistance system includes a sensor component for detecting the surrounding traffic, including at least one sensor, a radar sensor for example, and corresponding electronic devices for data preparation, an actuator component, which intervenes in the drive system, the brake system, or the steering of the vehicle, and/or a driver interface for outputting warning signals to the driver, as well as a data processing device, which generates control signals for the actuator component on the basis of the data provided by the sensor component.

The function of the data processing device depends, at least implicitly, on one or more environmental hypotheses which determine how the sensor data are interpreted. For example, an environmental hypothesis for the ACC assistance function may be the following: "There is a vehicle ahead, which has distance d and relative velocity v with respect to the host vehicle." Since the data delivered by the sensor device, for example, the radar sensor, are continuously updated in successive measuring cycles, environmental hypotheses could additionally contain the following statement: "The vehicle ahead detected in the current cycle is identical to the vehicle ahead which was positioned in the previous measuring cycle."

If a driver assistance system has a plurality of assistance functions, e.g., a combination of ACC and PSS, it is desirable for the sensor component needed for the ACC function, i.e., the radar sensor for example, and if possible also the corresponding data preparation system, to also be used for the PSS function to reduce the overall installation complexity required.

However, this concept encounters a limitation in the data preparation stage, at the latest, since the measuring data for the different assistance functions must be prepared in different and specific ways adapted to the particular function. Accordingly, the underlying environmental hypotheses are also specifically adapted to the assistance function. For example, an environmental hypothesis for the PCC function may be the following: "There is an obstacle whose distance is at least $d_{min}$ and whose (usually negative) relative velocity is at least $v_{min}$." While the output quantities distance and relative velocity, which are transferred to the ACC function and the PSS function, are formally the same, their meanings and specific numerical values are not identical. While for distance regulation within the ACC function it is sufficient to know the most probable values of the distance and relative velocity, in a safety function such as PSS, the tolerance limits or the probability distributions of these quantities are also relevant. In particular, in a safety function, the most probable value of the distance is less relevant than the still remaining distance of the obstacle from the host vehicle assuming the most unfavorable case and taking into consideration all measuring inaccuracies.

This is also true for other quantities calculated from the raw data delivered by the radar sensor. For example, in the case of an angle-resolving radar sensor, it is possible to calculate transverse position y of an object relative to the longitudinal axis of the host vehicle from the measured azimuth angle of the object and its distance. In the case of a vehicle ahead within the ACC function, this quantity is relevant for the decision of whether the vehicle is in its own lane or on a neighboring lane. The term "vehicle ahead" includes the notion that the vehicle is traveling on the same lane as the host vehicle. In contrast, in the case of the PSS function, obstacles which only partially protrude into the host vehicle's lane or approach the host vehicle's lane from the side are also taken into account. In addition, in this case it would be relevant to ask whether it is possible to drive around the obstacle. In this context, additional information about the possible width of the object would also be desirable. Such information may be obtained in principle from the radar data if there is a plurality of reflection centers in the case of a very wide object such as a truck so that radar echoes, for which the distances and relative velocities are identical, but the azimuth angles are slightly different, are obtained. In contrast, this width information is not needed for distance regulation within the ACC function.

These examples illustrate that, although the different assistance functions depend on partially identical measuring quantities, they each require specific preparation of these measured quantities.

The underlying terms of the environmental hypotheses "vehicle ahead" and "obstacle" are also not identical, since their definitions depend on the different criteria and boundary conditions. For example, the environmental hypothesis "vehicle ahead" may assume that the ACC system is active and is in the follow mode. Since ACC systems are typically activatable only when the velocity of the host vehicle is above a certain minimum value, this also implies certain conditions regarding the velocity of the host vehicle. The term "vehicle ahead" typically also implies that the driver of this vehicle is traveling in a comfort-oriented mode, i.e., he will foreseeably not perform any abrupt maneuvers such as full braking or the like. Although there may be similar boundary conditions for the environmental hypothesis "obstacle," they are not identical to those for a vehicle ahead. For example, a vehicle traveling ahead which performs sudden emergency braking qualifies as an obstacle, and no longer as a vehicle ahead.

For the ACC systems in use today, the term "vehicle ahead" also implies a moving object. In contrast, the environmental hypothesis "obstacle" within a PSS function should also refer to stationary objects whenever possible. In a variant of the ACC function known as "stop-and-go" it again behaves differently and, when approaching a traffic jam, it allows the host vehicle to be braked to a standstill when the vehicle ahead stops. In this case the definition of the term "vehicle ahead" will also include stationary objects, as long as these objects have moved at some time in the past.

Due to the different term definitions on which the different environmental hypotheses are based, and due to the different nature of the output data for the different assistance functions, it has also been possible to use the raw data of a shared sensor, although further preparation of the data must take place in specially adapted processing stages.

SUMMARY OF THE INVENTION

The present invention offers the advantage that it makes possible better use of synergies in driver assistance systems having a plurality of assistance functions so that the data needed for the different functions may be detected and prepared more efficiently. In particular, this results in reduced data processing complexity, so that savings may be achieved with respect the necessary hardware and a more differentiated detection of the traffic surroundings with the same computing capacity is made possible, with a higher time resolution if necessary. Simple expansibility of the system by additional assistance functions and/or evaluation criteria is another advantage.

This is achieved according to the present invention by making the environmental hypotheses needed for the different assistance functions explicit in a data structure of modular design. For this purpose, the environmental hypothesis is divided into a plurality of partial hypotheses which have a defined logical relationship with one another. The partial hypotheses and their logical relationships are defined in such a way that they correspond to certain terms and to the logical relationships between these terms. For example, two partial hypotheses "obstacle" and "vehicle ahead" may be defined so that their logical relationship is a subset relationship (the vehicles ahead form a subset of the set of obstacles) or an implication (the existence of a vehicle ahead implies the existence of an obstacle).

The technical advantage is that the hypothesis "vehicle ahead" and the corresponding output data for the ACC function do not need to be generated from the ground up from the raw data of the radar sensor, but the processing results already obtained when generating the "obstacle" hypothesis may be used for this purpose. The processing results, i.e., the output data of the partial hypothesis "obstacle" are thus used twice, namely both for further processing in the "vehicle ahead" hypothesis and also directly as output data for the PSS function. In this way, the present invention makes it possible to jointly use sensor components of a plurality of assistance functions. In practice, the structure of the environmental hypotheses may, of course, be substantially more complex and may include considerably more partial hypotheses. The logical relationships between the partial hypotheses are not limited to implications, but may also be formed by other logical operators such as AND, OR, NOT and the like.

A particular advantage is the easy expansibility of the system resulting from the fact that in principle any partial function may be used as a "compression node," which makes suitably pre-compressed data for newly added partial hypotheses and/or assistance functions available. The possibility of merging the measurement results of a plurality of sensors working independently of one another by logically linking the partial hypotheses obtained via the measurement results of the different sensors is also advantageous.

BRIEF DESCRIPTION OF THE DRAWINGS

FIG. 1 shows a block diagram of the driver assistance system according to the present invention.

FIG. 2 shows a block diagram of a comparative example of a driver assistance system.

FIG. 3 shows a data structure of a partial hypothesis in the assistance system of FIG. 1.

DETAILED DESCRIPTION

Figure 4:
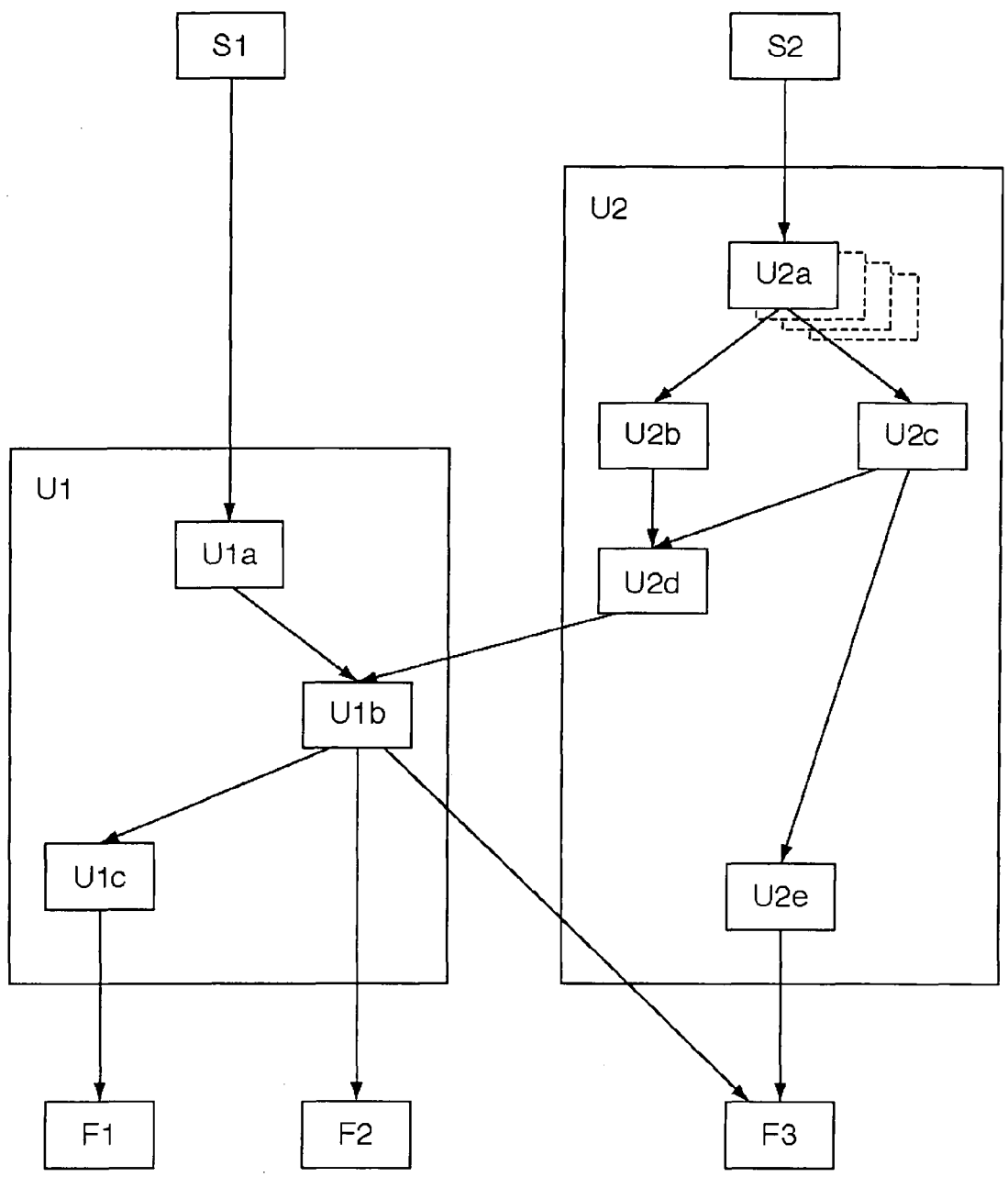
FIG. 4 shows a block diagram of a driver assistance system according to another exemplary embodiment of the present invention.

The driver assistance system shown in FIG. 1 includes a sensor S1, a radar sensor for example, for detecting the traffic environment, a data processing device 10, which is formed, for example, by one or more microprocessors and, in the example shown, generates an environmental hypothesis U1 on the basis of the data of sensor S1, and two assistance functions F1, F2, which may be an ACC function and a PSS function, for example.

Each assistance function F1, F2 includes an actuator component (not shown in detail), which makes interventions in other subsystems of the vehicle possible, and a smart component which uses environmental hypothesis U1 to further process prepared data and generate control signals for the actuator component. The actuator component may be the drive system or the brake system of the vehicle or also a warning signal device for outputting a warning signal to the driver. The smart component may be formed by the host vehicle's own computer or, optionally, by a software module running on data processing device 10.

In the highly simplified example shown, environmental hypothesis U1 has three partial hypotheses U1$a$, U1$b$, and U1$c$. Partial hypotheses U1$b$ and U1$c$ also form, in the example shown, specific environmental hypotheses which are each associated with one of assistance functions F1 and F2 and deliver output data which are prepared in view of the particular assistance function.

Sensor S1 delivers "raw data," for example, distances d, relative velocities v, and azimuth angles of objects the position of which has been determined by the radar sensor to be in the front field of the vehicle. Each local reflection maximum in the received radar signal is identified by a set of data d, v, and assigned to an object of an environmental hypothesis. The radar sensor operates cyclically and the data sets for the located objects are updated in each measuring cycle.

Partial hypotheses U1$a$, U1$b$, and U1$c$ each represent a certain term which is defined by suitable definition criteria and described using a special aspect of the environment. As an example, it may be assumed that partial hypothesis U1$a$ corresponds to the term "potential obstacle," partial hypothesis U1$b$ to the term "actual obstacle," and partial hypothesis U1$c$ to the term "vehicle ahead." A potential obstacle is to be understood as an object for which there is the possibility, but not certainty, that this object requires a response of one of assistance functions F1, F2. An actual obstacle is to be understood as an object for which it is considered certain on the basis of plausible assumptions that a response of one of the assistance functions is required. Actual obstacles thus form a subset of the set of potential obstacles. A vehicle ahead is to be understood as an object which, on the basis of plausible assumptions, is a vehicle traveling directly ahead of the host vehicle in the same lane and has been or may be selected by assistance function F1 (ACC) as a target object for distance regulation or is followed by the driver in manual follow mode. Vehicles ahead thus form a subset of the set of actual obstacles.

Environmental hypothesis U1 may thus be understood as a library of predefined terms, each having special definition criteria and being in defined logical relationships with one another.

When generating partial hypothesis U1a, a data set is calculated for each object from the data d, v, delivered by sensor S1, this data set containing position coordinates dx, dy of the object in a two-dimensional Cartesian coordinate system (zero point in the center in front of the host vehicle, x axis in the direction of the vehicle's length, and y axis in the transverse direction). In addition, this data set also contains corresponding components vx, vy of the relative velocity and components ax, ay of the relative acceleration. When the position coordinate dy is within a certain range which approximately corresponds to the width of the host vehicle's lane, the environmental hypothesis "potential obstacle" is generated for this object, and the corresponding location, velocity, and acceleration data are transferred as output data tot partial hypothesis U1b.

It must be taken into account that, due to unavoidable measuring inaccuracies and interference, quantities dx, dy, vx, vy, ax, and ay are not able to be measured or calculated exactly, but only a certain probability distribution may be specified for these quantities. These probability distributions are transferred to partial hypothesis U1b. In FIG. 1 this is symbolized by parentheses around quantities dx, dy, etc.

When generating environmental hypothesis U1b, it is then decided on the basis of the data obtained whether this is an actual obstacle. A decision criterion may be, for example, whether there is a certain minimum difference between the signal amplitude received by the radar sensor for this object and the noise level. In this case, the particular signal amplitudes are also transmitted by sensor S1 to partial hypothesis U1a and conveyed from there to partial hypothesis U1b. Another criterion may be that the position of an actual obstacle must be determined in a stable manner over a certain period of time, and must have a physically possible movement pattern, i.e., for example, should not bounce erratically between different locations. In this case, in the case of partial hypothesis U1b, the results of previous measuring cycles must be used, and the object located in the current measuring cycle must be found to be identical to an object located in one of the previous cycles.

When sensor S1 positions a plurality of objects simultaneously, a separate partial hypothesis U1a is set up for each object on the basis of the same term definition, but with different output data dx, dy, etc., in each case. The "non-actual" obstacles are then filtered out when partial hypothesis U1b is generated, and only the data of the actual obstacles are forwarded to the subsequent instances.

One of the subsequent instances in the example shown is assistance function F2, which causes a collision warning signal to be output to the driver, for example, when an actual obstacle representing an acute collision danger has been detected. Within this assistance function, the probability distributions of the different quantities dx, dy, etc., are therefore analyzed to determine the magnitude of the collision danger.

The deceleration of the host vehicle that would be necessary to avoid a collision may be used, for example, as a measure of the magnitude of the collision danger. When the different probability distributions are analyzed, the most unfavorable case is always used as a basis, for example, the shortest distance for which there is still some probability that the obstacle is located there is taken as minimum distance $dx_{min}$. A corresponding reasoning also applies to the other quantities.

The output data of environmental hypothesis U1b are also output to environmental hypothesis U1c at the same time. A check is performed here to determine whether there is a vehicle ahead among the actual obstacles to which environmental hypothesis U1b applies. This assumes that assistance function F1 is active and is in the follow mode. If only distance regulation to moving vehicles is provided within this assistance function, the condition that the absolute velocity of the object is different from zero must also be met (the absolute velocity is obtained from the difference between relative velocity vx and the host vehicle's velocity). If this condition is met for a plurality of actual obstacles, the obstacle having shortest distance dx is selected as the vehicle ahead. The most probable values for the quantities needed for distance regulation, dx, vx, and ax of this vehicle ahead are then transmitted to assistance function F1. At this point the calculation results obtained at the time partial hypotheses U1a and U1b were generated may be used, so that unnecessary double calculations are avoided.

In this way each of assistance functions F1 and F2 may be supplied with the necessary data especially adapted to the particular function, using minimum complexity.

For comparison, FIG. 2 shows a block diagram for the similar case in which instead of a structured environmental hypothesis divided into partial hypotheses, only implicit environmental hypotheses U1 and U2 are used which are specifically adapted to the corresponding assistance functions F1 and F2, respectively. Even if only one sensor S1 is available for both assistance functions, the raw data of this sensor must be processed simultaneously, so that at least some of the calculations must be performed more than once.

FIG. 3 shows an example of a data structure of an individual partial hypothesis in FIG. 1.

This data structure is predefined in data processing device 10 and includes a fixedly stored static part having two blocks DEF and ALG and a dynamic part for storing variables EXIST, R'1, . . . R'n. Input data R1, . . . Rn are supplied to blocks DEF and ALG of the static part. These input data are either data of sensor S1 or output data of a partial hypothesis having precedence in the logical structure. Additional data referring, for example, to the status of assistance functions F1, F2, or to other boundary conditions may be supplied.

The definition criteria for the term represented by the partial hypothesis are specified in block DEF. The algorithms via which output data R'1, . . . R'n, which are to be transferred in the subsequent instance(s), are calculated from input data R1, . . . Rn are specified in block ALG. Input data R1, . . . , Rn (or possibly also output data R'1, . . . , R'n calculated therefrom with the aid of the algorithms) are checked to determine whether they meet the stored definition criteria. The result of this check determines the value of an existence parameter EXIST, which specifies whether the partial hypothesis (for at least one object) exists. If the partial hypothesis exists for a plurality of objects, this is also specified by the existence parameter. The existence parameter may have the form of a yes/no statement; however, optionally it may also be a probability of existence between 0 and 1, which is processed as fuzzy logic.

The existence parameter and output data R'1, . . . R'n are then transferred to the subsequent instance or the plurality of subsequent instances, for example, in the case of partial hypothesis U1b, to partial hypothesis U1c and assistance function F2. When the data structure depicted in FIG. 3 represents partial hypothesis U1b, it would also receive an existence parameter from partial hypothesis U1a, as indicated in FIG. 3 by a dashed arrow, and partial hypothesis U1b would be generated only under the condition that partial hypothesis U1a is met for at least one object.

FIG. 4 shows a possible expansion of the driver assistance system of FIG. 1. A warning about leaving the lane is provided here as an additional assistance function F3, i.e., the driver receives a warning instruction when he is about to drive through the boundaries of his own lane. For this purpose, a video sensor is provided, for example, as additional sensor S2, and the data of this video sensor are analyzed according to an environmental hypothesis U2, which has an interconnected structure having a plurality of partial hypotheses U2a, U2b, U2c, U2d, and U2e. The individual partial hypotheses have the following meanings here:

U2a: The video sensor has detected at least one object. In the case of a plurality of objects, a corresponding plurality of copies of partial hypothesis U2a is generated.

U2b: The object is a spatial object, extending in the vertical direction. This is recognizable on the basis of certain geometric features of the image of the object, or on the basis of certain features of the apparent movement of the object which is caused by the movement of the camera itself.

U2c: The object is a flat object, namely a road marking, and defines the left and right boundaries of the lane.

U2d: The spatial object which was detected in U2b is within the lane.

U2e: The host vehicle is about to cross a lane boundary.

In the case of environmental hypothesis U2, efficient data processing is achieved by partial hypotheses U2b and U2c jointly using the results of partial hypothesis U2a. Similarly, also in the case of partial hypothesis U2d, the results of partial hypotheses U2b and U2c are combined.

In turn, the results of partial hypothesis U2d flow into partial hypothesis U1b, i.e., they contribute to the decision of whether the object is an actual obstacle. In this case, an actual obstacle must not only meet the criteria which were elucidated in connection with FIG. 1, but also the criterion that the video sensor has also detected a spatial object approximately in the place which is specified by partial hypothesis U1a. This system expansion thus makes it possible to reliably differentiate between actual obstacles and apparent obstacles such as a tin can lying on the road, which does generate a radar echo, but is not qualified by the video sensor as a spatial object.

Furthermore, the results of partial hypothesis U1b (actual obstacle) are also made available to assistance function F3 (warning about leaving the lane). If, for example, partial hypothesis U2a says that the host vehicle is about to cross the left-hand lane boundary and, at the same time, partial hypothesis U1b says that there is an actual obstacle in the host vehicle's lane, it is to be assumed that the driver is not accidentally crossing the left-hand lane boundary, but intentionally wishes to change to the left-hand neighboring lane to evade the obstacle. Therefore, in this case, the superfluous warning about leaving the lane may be suppressed. This example illustrates how the modular structure of environmental hypotheses U1 and U2 facilitates the expansion of the functionality by additional assistance functions and checking criteria while also ensuring efficient data processing with maximum utilization of already existing results.

What is claimed is:

1. A driver assistance system for a motor vehicle, comprising:
    a sensor device for measuring data about an environment of the vehicle;
    at least two assistance functions dependent on the measured data; and
    a data processing device, which analyzes the measured data and generates at least one specific environmental hypothesis for each assistance function, which provides output data in a form prepared for the corresponding assistance function,
    wherein at least one environmental hypothesis which has a structure divided into a plurality of partial hypotheses is predefined in the data processing device, the partial hypotheses having a logical relationship with one another such that output data of one partial hypothesis flow into the generation of another partial hypothesis, and at least two assistance functions directly or indirectly use a shared partial hypothesis,
    wherein the at least one environmental hypothesis determines how the measured data is interpreted,
    wherein each of the partial hypotheses represents a term described by an aspect of the environment,
    wherein the logical relationship between partial hypotheses includes at least one of a subset relation and an implicit relation, and
    wherein a warning about leaving a lane is provided as an additional assistance function, wherein an additional sensor provides data which is analyzed according to a second environmental hypothesis, which has an interconnected structure having a plurality of partial hypotheses, wherein the plurality of partial hypotheses is as follows:
        (a) the sensor has detected at least one object, and for a plurality of objects, a corresponding plurality of copies of the first partial hypothesis is generated;
        (b) the object is a spatial object extending in the vertical direction;
        (c) the object is a flat object that defines a left boundary and a right boundary of the lane;
        (d) the spatial object which was detected in (b) is within the lane; and
        (e) the vehicle is about to cross a lane boundary;
    wherein for the second environmental hypothesis, efficient data processing is achieved by partial hypotheses (b) and (c) jointly using the results of partial hypothesis (a), and wherein for partial hypothesis (d), the results of partial hypotheses (b) and (c) are combined.

2. The driver assistance system of claim 1, wherein the hypothesis is "vehicle ahead."

3. The driver assistance system of claim 2, wherein the potential hypotheses are "potential obstacle," and "obstacle."

4. A method of a driver assistance system for a motor vehicle, comprising:
    measuring, at a sensor device, data about an environment of the vehicle based on which at least two assistance functions dependent;
    analyzing, at a data processing device, the measured data and generating at least one specific environmental hypothesis for each assistance function, which provides output data in a form prepared for the corresponding assistance function,
    wherein at least one environmental hypothesis which has a structure divided into a plurality of partial hypotheses is predefined in the data processing device, the partial hypotheses having a logical relationship with one another such that output data of one partial hypothesis flow into the generation of another partial hypothesis, and at least two assistance functions directly or indirectly use a shared partial hypothesis, wherein the at least one hypothesis determines how the measured data is interpreted, wherein each of the partial hypotheses represents a term described by an aspect of the environment, wherein the logical relationship between partial hypotheses includes at least one of a subset relation and an implicit relation, and wherein a warning about leaving a lane is provided as an additional assistance function, wherein an additional sensor provides data which is analyzed according to a second environmental hypothesis, which has an interconnected structure having a plurality of partial hypotheses, wherein the plurality of partial hypotheses is as follows:
(a) the sensor has detected at least one object, and for a plurality of objects, a corresponding plurality of copies of the first partial hypothesis is generated;
(b) the object is a spatial object extending in the vertical direction;
(c) the object is a flat object that defines a left boundary and a right boundary of the lane;
(d) the spatial object which was detected in (b) is within the lane; and
(e) the vehicle is about to cross a lane boundary;
wherein for the second environmental hypothesis, efficient data processing is achieved by partial hypotheses (b) and (c) jointly using the results of partial hypothesis (a), and wherein for partial hypothesis (d), the results of partial hypotheses (b) and (c) are combined.

5. The method of claim 4, wherein the hypothesis is "vehicle ahead."

6. The method of claim 5, wherein the potential hypotheses are "potential obstacle," and "obstacle."

7. The method of claim 5, wherein when generating the environmental hypothesis, it is decided on the basis of the data obtained whether this is an actual obstacle.

8. The method of claim 4, wherein when generating the environmental hypothesis, it is decided on the basis of the data obtained whether this is an actual obstacle, and wherein a decision criterion is whether there is a certain minimum difference between the signal amplitude received by the radar sensor for this object and the noise level.

9. The method of claim 4, wherein a decision criterion is whether there is a certain minimum difference between the signal amplitude received by the radar sensor for this object and the noise level, and wherein signal amplitudes are transmitted by the sensor to a first partial hypothesis and conveyed from there to a second partial hypothesis.

10. The method of claim 4, wherein a decision criterion is that the position of an actual obstacle must be determined in a stable manner over a certain period of time, and it must have a physically possible movement pattern.

11. The method of claim 4, wherein a decision criterion is that the position of an actual obstacle must be determined in a stable manner over a certain period of time, and it must have a physically possible movement pattern, and wherein in the case of a second partial hypothesis, the results of previous measuring cycles must be used, and the object located in the current measuring cycle must be found to be identical to an object located in one of the previous cycles.

12. The method of claim 4, wherein a partial hypothesis data structure is predefined in a data processing device and includes a fixedly stored static part having at least two blocks and a dynamic part for storing variables, and wherein input data are supplied to the at least two blocks of the static part.

13. The method of claim 4, wherein a partial hypothesis data structure is predefined in a data processing device and includes a fixedly stored static part having at least two blocks and a dynamic part for storing variables, and wherein input data are supplied to the at least two blocks of the static part, and wherein the input data are either data of the sensor or output data of a partial hypothesis having precedence in a logical structure.

14. The method of claim 4, wherein a warning about leaving a lane is provided as an additional assistance function, wherein an additional sensor provides data which is analyzed according to an environmental hypothesis, which has an interconnected structure having a plurality of partial hypotheses.

15. The method of claim 4, wherein the results of partial hypothesis (d) contribute to the decision of whether the object is an actual obstacle, so as to reliably differentiate between actual obstacles and apparent obstacles.

16. A driver assistance system for a motor vehicle, comprising:
a sensor device for measuring data about an environment of the vehicle;
at least two assistance functions dependent on the measured data; and
a data processing device, which analyzes the measured data and generates at least one specific environmental hypothesis for each assistance function, which provides output data in a form prepared for the corresponding assistance function,
wherein at least one environmental hypothesis which has a structure divided into a plurality of partial hypotheses is predefined in the data processing device, the partial hypotheses having a logical relationship with one another such that output data of one partial hypothesis flow into the generation of another partial hypothesis, and at least two assistance functions directly or indirectly use a shared partial hypothesis,
wherein the at least one environmental hypothesis determines how the measured data is interpreted,
wherein each of the partial hypotheses represents a term described by an aspect of the environment,
wherein the logical relationship between partial hypotheses includes at least one of a subset relation and an implicit relation,
wherein a warning about leaving a lane is provided as an additional assistance function, and wherein an additional sensor provides data which is analyzed according to a second environmental hypothesis, which has an interconnected structure having a plurality of partial hypotheses, and
wherein the plurality of partial hypotheses is as follows:
(a) the sensor has detected at least one object, and for a plurality of objects, a corresponding plurality of copies of the first partial hypothesis is generated;
(b) the object is a spatial object extending in the vertical direction;
(c) the object is a flat object that defines a left boundary and a right boundary of the lane;
(d) the spatial object which was detected in (b) is within the lane; and
(e) the vehicle is about to cross a lane boundary.

17. The driver assistance system of claim 16, wherein for the second environmental hypothesis, efficient data processing is achieved by partial hypotheses (b) and (c) jointly using the results of partial hypothesis (a).

18. The driver assistance system of claim 16, wherein for partial hypothesis (d), the results of partial hypotheses (b) and (c) are combined.

* * * * *

UNITED STATES PATENT AND TRADEMARK OFFICE
CERTIFICATE OF CORRECTION

PATENT NO. : 8,483,906 B2 Page 1 of 1
APPLICATION NO. : 11/883969
DATED : July 9, 2013
INVENTOR(S) : Lucas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1221 days.

Signed and Sealed this
Eighth Day of September, 2015

Michelle K. Lee
*Director of the United States Patent and Trademark Office*